United States Patent [19]

Brown et al.

[11] 4,166,504

[45] Sep. 4, 1979

[54] HIGH VERTICAL CONFORMANCE STEAM DRIVE OIL RECOVERY METHOD

[75] Inventors: Alfred Brown; Wann-Sheng Huang; Yick-Mow Shum, all of Houston, Tex.

[73] Assignee: Texaco Inc., White Plains, N.Y.

[21] Appl. No.: 936,557

[22] Filed: Aug. 24, 1978

[51] Int. Cl.² .............................................. E21B 43/24
[52] U.S. Cl. .................................. 166/272; 166/263; 166/274; 166/306
[58] Field of Search ............... 166/272, 273, 274, 263, 166/245, 306

[56] References Cited

U.S. PATENT DOCUMENTS

| 3,042,114 | 7/1962 | Willman | 166/272 |
| 3,129,758 | 4/1964 | Closmann | 166/272 X |
| 3,294,164 | 12/1966 | Hardy et al. | 166/274 |
| 3,336,977 | 8/1967 | Amott | 166/274 |
| 3,406,755 | 10/1968 | Sharp | 166/272 X |
| 3,412,794 | 11/1968 | Craighead | 166/272 |
| 3,759,326 | 9/1973 | Christopher et al. | 166/274 X |
| 3,850,243 | 11/1974 | Allen et al. | 166/274 X |
| 4,088,188 | 5/1978 | Widmyer | 166/269 |
| 4,124,071 | 11/1978 | Allen et al. | 166/272 X |

*Primary Examiner*—Stephen J. Novosad

*Attorney, Agent, or Firm*—Carl G. Ries; Thomas H. Whaley; Jack H. Park

[57] ABSTRACT

The vertical conformance of a steam drive process is improved and steam override reduced by penetrating the zone between one injection well and one producing well, with an infill well which is in fluid communication with the bottom half or less of the formation, and producing petroleum from the infill well after steam channeling has occurred at the production well; then converting the infill well from a producer to an injector and injecting steam into the lower portion of the formation via the infill well and recovering fluids from the production well. Two separate communication paths are established, one between the surface and the upper half or less of the formation, and one between the bottom half or less of the formation in the producing well, or in the infill well, or injection well, or combination of two or more thereof. A fluid having lower mobility than steam is injected into the upper part of the formation via one or more of the communication means after steam override has begun, to resaturate the steam swept zone with the low mobility fluid to prevent further steam flow therethrough and force steam to flow into unswept portions of the formation.

36 Claims, 9 Drawing Figures

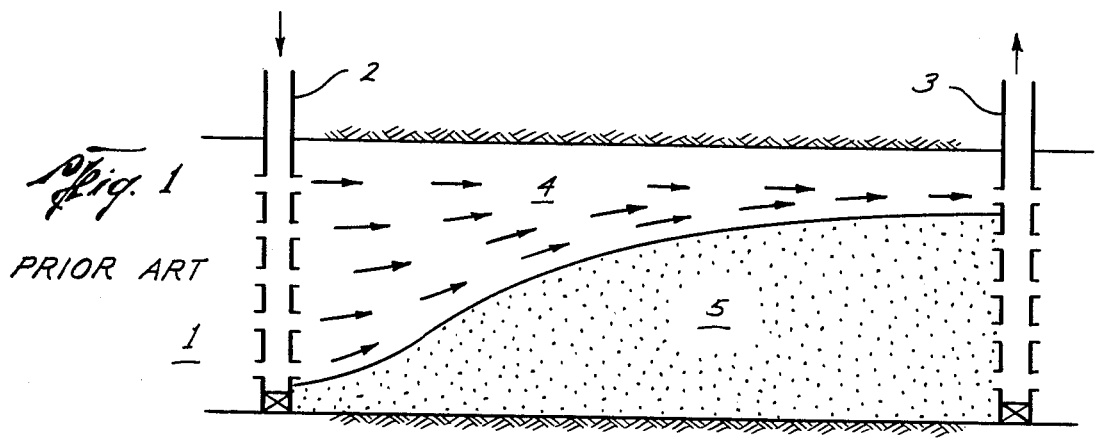
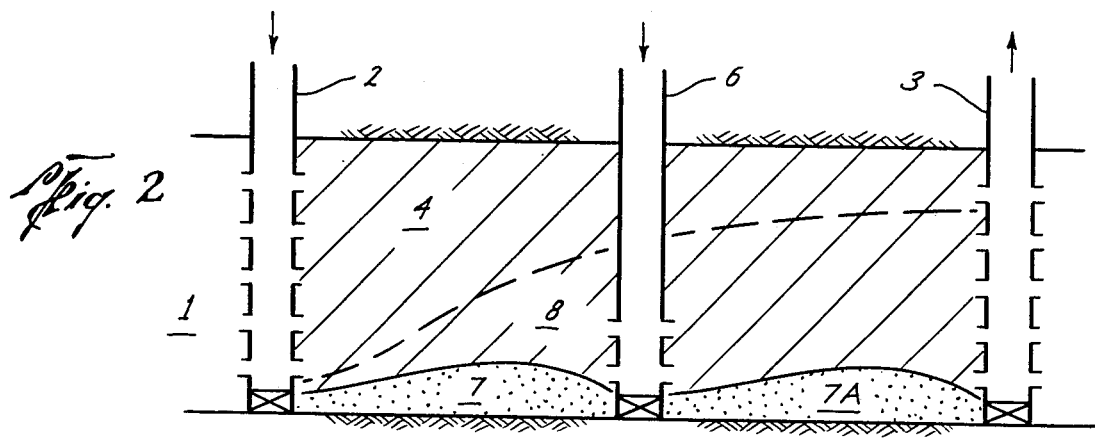
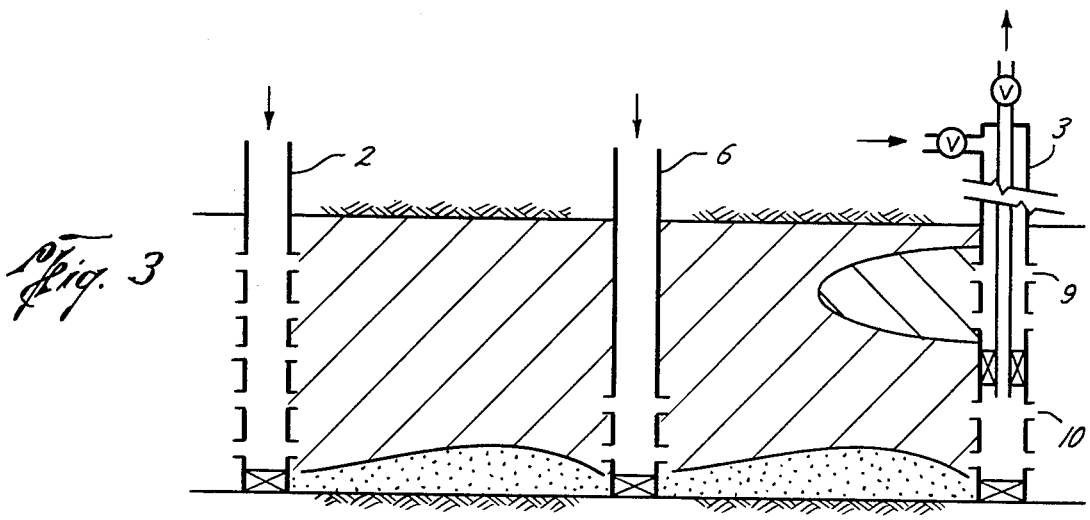

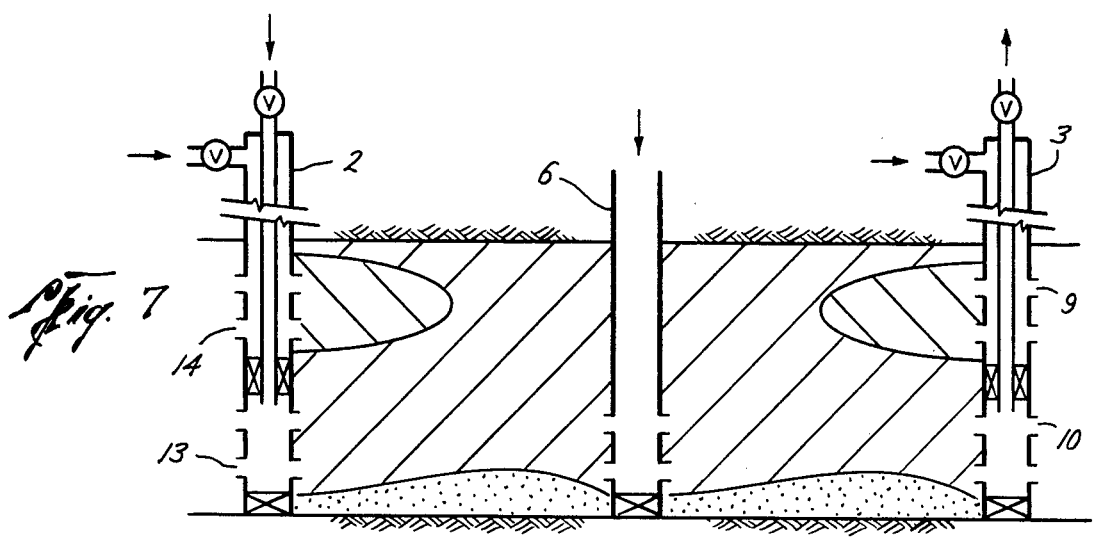
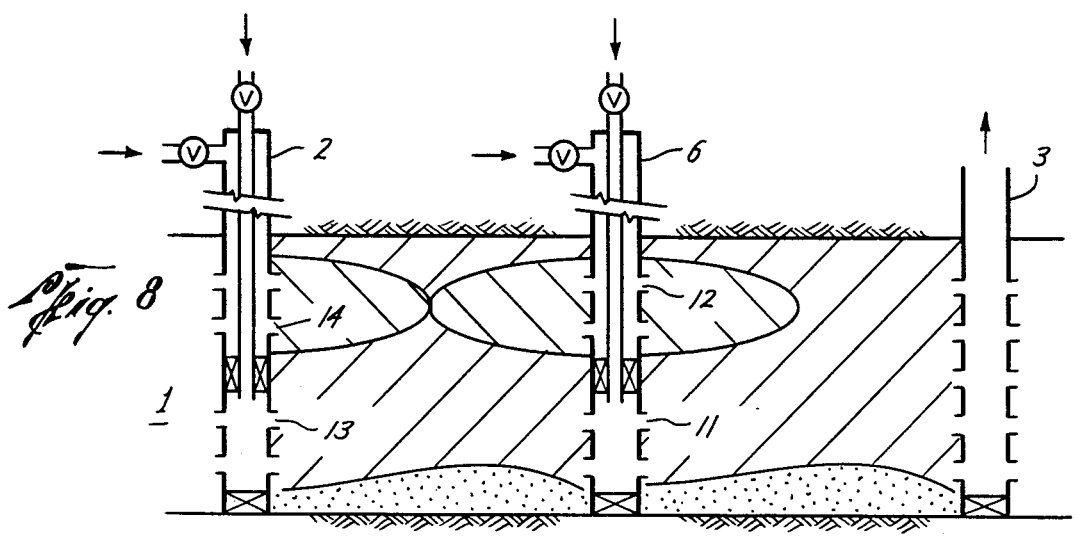
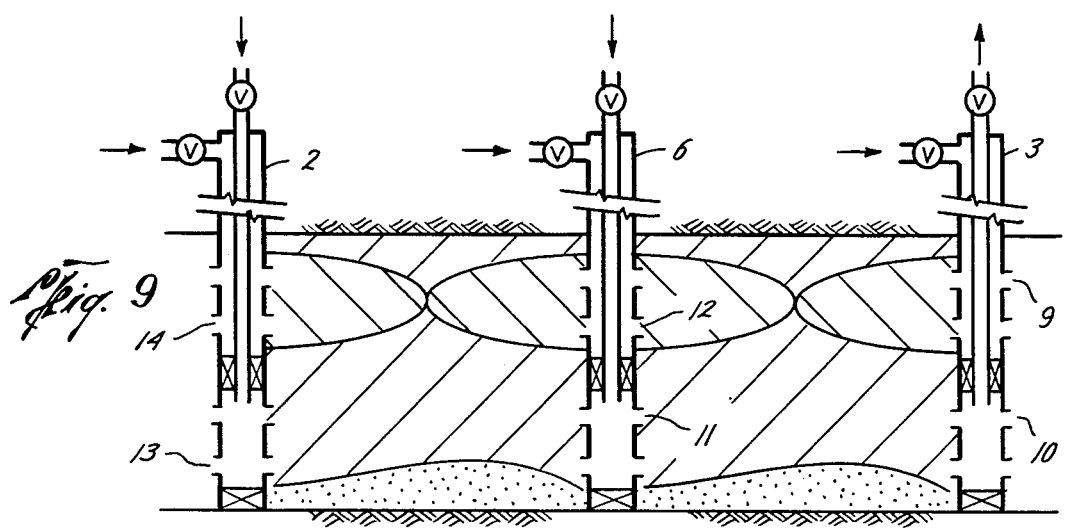

HIGH VERTICAL CONFORMANCE STEAM DRIVE OIL RECOVERY METHOD

FIELD OF THE INVENTION

The present invention concerns a steam throughput or steam drive oil recovery method. More particularly, the present invention involves a steam drive oil recovery method especially suitable for use in relatively thick, viscous oil-containing formations, by means of which viscous oil may be recovered from the formation with improved vertical conformance and reduced steam overriding which reduces the amount of oil recovered from the formation.

BACKGROUND OF THE INVENTION

It is well recognized by persons skilled in the art of oil recovery that there are formations which contain petroleum whose viscosity is so great that little or no primary production is possible. Some form of supplemental oil recovery must be applied to these formations which decreases the viscosity of the petroleum sufficiently that it will flow or can be displaced through the formation to production wells and then through to the surface of the earth. Thermal recovery techniques are quite effective viscous oil recovery methods, and steam flooding is the most successful thermal oil recovery technique yet employed in commercial application. Steam may be utilized for thermal stimulation for viscous oil formations by means of a "huff and puff" technique in which steam is injected into a well, allowed to remain in the formation for a soak period, and then oil is recovered from the formation by means of the same well as was used for steam injection. Another technique employing steam stimulation is a steam drive or steam throughput process, in which steam is injected into the formation on a more or less continuous basis by means of an injection well and oil is recovered from the formation from a spaced-apart production well. This technique is somewhat more effective in many applications than the "huff and puff" steam stimulation process since it both reduces the viscosity of the petroleum and displaces petroleum through the formation, thus stimulating oil production from a production well. While this process is very effective with respect to the portions of the recovery zone between the injection well and production well through which the steam travels, poor vertical conformance is often experienced in steam drive oil recovery processes. A major cause of poor vertical conformance is associated with the fact that steam, being of lower density than other fluids present in the permeable formation, migrates to the upper portion of the permeable formation and channels across the top of the oil formation to the remotely located production well. Once steam channeling has occurred in the upper portion of the formation, the permeability of the steam-swept zone is increased due to the desaturation or removal of petroleum from the portions of the formation through which steam has channeled. Thus subsequently-injected steam will migrate almost exclusively through the steam-swept channel and very little of the injected steam moves into the lower, unswept portions of the formation, and thus very little additional petroleum is recovered from the lower portions of the formation. While steam drive processes effectively reduce the oil saturation in the portion of the formation through which they travel by a significant amount, a portion of the recovery zone between the injection and production systems actually contacted by steam is often less than 50 percent of the total volume of that recovery zone, and so a significant amount of oil remains in the formation after completion of the steam drive oil recovery process. The severity of the poor vertical conformance problem increases with the thickness of the oil formation and with the viscosity of the petroleum contained in the oil formation.

In view of the foregoing discussion, and the large deposits of viscous petroleum from which only a small portion can be recovered because of the poor conformance problem, it can be appreciated that there is a serious need for a steam drive thermal oil recovery method suitable for use in recovering viscous petroleum from relatively thick formations with improved vertical conformance.

SUMMARY OF THE INVENTION

The process of our invention involves an improvement in a multi-step process involving at least one injection well for injecting steam into the formation and at least one production well for recovering petroleum from the formation and a third well, referred to herein as an infill well, which is drilled into the formation and in which fluid communication between the well and the formation is established with only the lower 50 percent and preferably the lower 25 percent of the viscous oil formation. The three well process for which the present process is an improvement comprises injecting steam into the injection well and recovering petroleum from the production well as is conventionally practiced in the art until steam breakthrough at the production well occurs. At this time, as little as 50 percent or less of the formation will have been swept by steam due to steam channeling through the upper portions of the formation. At this point, steam injection into the injection well is continued and production of petroleum is taken from the infill well, which recovers oil from the lower portion of the formation between the primary injection well and the infill well. This step is continued until the fluid being recovered from the infill well reaches a predetermined value, preferably at least 95 percent water (referred to in the art as 95 percent water cut). At this point, the infill well is converted from production well service to injection well service and steam, or hot water followed by steam, or cold water followed by hot water followed by steam, is injected into the infill well, which fluids displace oil toward the production well. This results in recovering viscous petroleum from the lower portion of that portion of the recovery zone between the infill well and the production well, which would ordinarily not be swept by steam. Once the water cut of the fluid being produced from the production well reaches a value of about 95 percent, injection of hot water into the infill well is terminated and steam is injected into both the infill well and the injection well, and fluids are produced from the original production well. Steam injection into the infill well continues until live steam production at the production well occurs. At least one of the three wells, or any two thereof, or all three wells, are completed with two separate flow paths from the surface of the earth, one in fluid communication with the upper half or less of the formation and one in fluid communication with the lower half or less of the formation. A fluid having mobility less than the mobility of steam is introduced into the upper part of the formation adjacent one or more of the wells employing the above-described communication path, at a point after steam breakthrough has occurred and steam override is present to a sufficient degree to cause poor vertical conformance in the portion of the formation adjacent to the well into which the low mobility fluid is being introduced. In its broadest aspect, the fluid may be cold water, whose mobility is significantly less than vapor phase steam in the flow channels of the formation, and will prevent migration of steam therethrough and divert steam into unswept, high oil saturation portions of the formation. Viscous fluids such as water having dissolved or dispersed therin materials which increase the viscosity of water may also be employed, such as temperature stable polymers, colloidal silica, or viscous oil and water emulsions may be employed as the low mobility fluid.

BRIEF DESCRIPTION OF THE DRAWINGS

FIG. 1 illustrates a subterranean formation penetrated by an injection well and a production well being employed in a state-of-the-art steam drive oil recovery method, illustrating how the injected steam migrates to the upper portions of the formation as it travels through the recovery zone within the formation and between the injection well and production well, thus bypassing a significant amount of petroleum in the recovery zone.

FIG. 2 illustrates the location of the infill well and its use in the process for which the present invention represents an improvement.

FIG. 3 illustrates a formation completed in accordance with one embodiment of the process of our invention with separate communication means being provided at the production well for injecting a low mobility fluid into the upper portion of the formation adjacent to the production well.

FIG. 7 illustrates another embodiment of the process of our invention in which the injection well and production well are each provided with two separate flow paths, each including one flow path between the surface of the earth and the upper half or less of the formation, which can be used in our process for introducing low mobility fluid into the upper portion of the formation adjacent to the injection well and production well.

FIG. 8 illustrates another embodiment of the process of our invention in which the injection well and the infill well are each provided with two separate flow paths, each well including one flow path between the surface of the earth and the upper half or less of the formation, which can be used for introducing a low mobility fluid into the upper part of the formation adjacent to the injection well and infill well.

FIG. 9 illustrates an especially preferred embodiment of the process of our invention in which all three wells, the injection well, infill well and production well, are each provided with two separate flow paths, each including one flow path from the surface of the earth to the upper half or less of the formation, for use in introducing a low mobility fluid into the steam swept, upper portion of the formation adjacent to all three wells.

DESCRIPTION OF THE PREFERRED EMBODIMENTS

Figure 4:
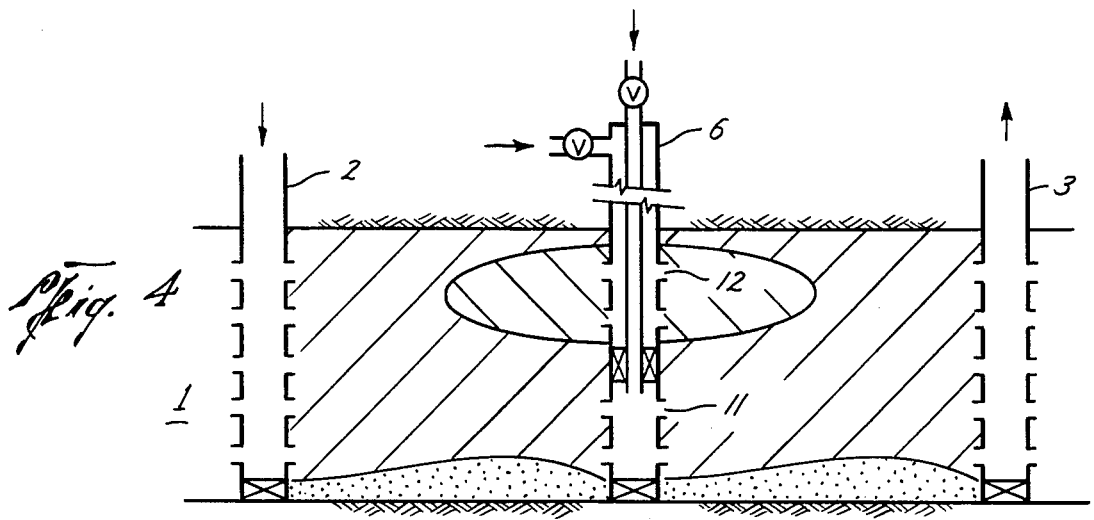
FIG. 4 illustrates another embodiment of the process of our invention, in which the infill well is provided with a separate fluid communication path between the surface and the upper portion of the formation adjacent to the infill well, for injecting a low mobility fluid into the upper portion of the formation adjacent to the infill well.

The problem of steam override for which the process of our invention represents a solution may best be understood by referring to the attached drawings, in which FIG. 1 illustrates how a relatively thick, viscous oil formation 1 penetrated by an injection well 2 and a production well 3 is used for a conventional steam drive oil recovery process. Steam is injected into well 2, passes through the perforations in well 2 into the viscous oil formation. Conventional practice is to perforate or establish fluid flow communications between the well and the formation throughout the full vertical thickness of the formation, both with respect to injection well 2 and production well 3. Not withstanding the fact that steam is injected into the full vertical thickness of the formation, it can be seen that steam migrates both horizontally and in an upward direction as it moves through the formation between injection well 2 and production well 3. The result is the creation of a steam-swept zone 4 in the upper portion of the formation and zone 5 in the lower portion of the formation through which little or no steam has passed. Once steam breakthrough at production well 3 occurs, continued injection of steam will not cause any steam to flow through section 5, because (1) the specific gravity of the substantially all vapor phase steam is significantly less than the specific gravity of the petroleum and other liquids present in the pore spaces of the formation, and so gravitational effects will cause the steam vapors to be confined exclusively in the upper portion of the formation, and (2) steam passage through the upper portion of the formation displaces and removes petroleum from that portion of the formation through which it travels, and desaturation of the zone increases the relative permeability of the formation significantly as a consequence of removing the viscous petroleum therefrom. Thus any injected fluid will travel more readily through the desaturated portion of the formation 4 than it will through the portion of the formation 5 which is near original conditions with respect to viscous petroleum saturation.

FIG. 2 illustrates how infill well 6 is drilled into the formation, with respect to injection well 2 and production well 3. Infill well 6 must be drilled into the recovery zone within the formation defined by injection well 2 and production well 3. It is not essential that infill well 6 be located on a line between injection well 2 and production well 3, and may be offset in either direction from a straight line arrangement, although one convenient location of infill well 6 is in alignment with wells 2 and 3. Similarly, it is not essential that well 6 be located exactly midway between injection well 2 and production well 3, and it is adequate for our purposes if a distance between injection well 2 and infill well 6 be from 25 to 75 percent and preferably from 40 to 60 percent of the distance between injection well 2 and production well 3. Infill well 6 is perforated or fluid flow communication is otherwise established between well 6 and the formation, only in the lower 50 percent or less and preferably in no more than the lower 25 percent of the formation. This is essential to the proper functioning of our process.

It is immaterial for the purpose of practicing our process, whether infill well 6 is drilled and completed at the same time as injection well 2 and production well 3, and/or if such drilling and completion of infill well 6 is deferred until steam breakthrough has occurred at production well 3, or if the well is drilled at some intermediate time. If completed prior to use, infill well 6 is simply shut in during the first phase of the process of our invention.

The fluid injected into injection well 2 during all of the steps described herein, as well as that injected into infill well 6 in the subsequent portion of our process comprises steam, although other substances may be used in combination with steam as is well described in the art. For example, noncondensible gases such as nitrogen or oil soluble gases such as carbon dioxide may be comingled with steam for the purpose of improved oil stimulation or to achieve other objectives. Materials which are miscible in formation petroleum may also be mixed with the steam, such as hydrocarbons in the range of $C_1$ to $C_{10}$, for the purpose of further enhancing the mobilizing effect of the injected fluids. Air may also be comingled with steam in a ratio from 0.05 to 2.0 standard cubic feet of air per pound of steam, which accomplishes a low temperature, controlled oxidation reaction within the formation, and achieves improved thermal efficiency under certain conditions. So long as the fluid injected into injection well 2 is comprised of a major portion of vapor phase steam, the problem of steam channeling will be experienced in the steam drive process no matter what other fluids are included in the injected steam, and the process of our invention may be incorporated into the modified steam drive oil recovery process with the resultant improvement in vertical conformance.

In copending applications, processes employing an infill well such as is illustrated in FIG. 2 are disclosed, which greatly reduce the amount of formation remaining unswept at the completion of a steam drive oil recovery process and consequently increase oil recovery. The process employing an infill well in its broadest aspect comprises a minimum of three steps to be applied to an oil formation. FIG. 2 illustrates a minimum three-well unit for employing this process wherein formation 1 is penetrated by an injection well 2 which is in fluid communication with the full vertical thickness of the formation. Spaced-apart production well 3 is a conventional production well, which is also in fluid communication with the full vertical thickness of the formation. Infill well 6 is shown located about midpoint between wells 2 and 3, and within the recovery zone defined by wells 2 and 3, i.e. on or adjacent to a line between wells 2 and 3, and fluid communication is established between well 6 and the lower portion of the formation, in this instance being about the lower one third of the total thickness of the formation.

In the first step, a thermal recovery fluid comprising steam is injected into the formation by means of injection well 2. Steam enters the portion of the formation immediately adjacent to well 2 through all of the perforations in well 2, and initially travels through substantially all of the full vertical thickness of formation 1. Because the specific gravity of vapor phase steam is significantly less than the specific gravity of other formation fluids, including the viscous petroleum present in the pore spaces of formation 1, steam vapors migrate in an upward direction due to gravitational effects, and as can be seen in FIG. 1, the portion 4 of the formation 1 swept by steam vapors in the first step represents an increasingly diminished portion of the vertical thickness of the formation as the steam travels between the injection well and production well 3. Thus by the time steam arrives at production well 3, only a small fraction of the full vertical thickness of the formation is being contacted by steam. Oil is recovered from the portion of the formation through which the steam vapors travel, but not from the portion which is not swept by steam; therefore the total recovery from the recovery zone defined by wells 2 and 3 will be significantly less than 50 percent of the total amount of petroleum in the recovery zone. Even though significantly more than 50 percent of the oil present in portion 4 of the formation is swept by steam, the large amount of oil unrecovered from that portion 5 of FIG. 1 through which very little of the steam passes causes the total recovery efficiency to be very low. The recovery efficiency as a consequence of this problem is influenced by the thickness of the formation, the well spacing, the viscosity of the petroleum present in the formation at initial conditions, as well as by other factors.

The first step comprising injecting steam into injection well 2 and recovering fluids from the formation by means of production well 3 continues until water or steam condensate production at well 3 reaches a predetermined level. The preferred method comprises continuing this step until live steam production occurs at well 3. Once steam is being produced in well 3, further production of oil will be at a much diminished rate, since the only mechanism by means of which additional oil can be recovered from the formation below the steam-swept zone 4 is by a stripping action, in which oil is recovered along the surface 7 between the steam-swept portion 4 of the formation and portion 5 of the recovery zone as shown in FIG. 1 through which steam has not passed. Although this mechanism may be continued for very long periods of time and oil can be recovered from zone 5 by this means, the stripping action is extremely inefficient and it is not an economically feasible means of recovering viscous oil from the formation after steam breakthrough occurs at well 3.

In the second step in the process employing use of infill wells, infill well 6 is utilized as a production well. It should be understood that a significant amount of oil is recovered from the formation by this step along which is not recovered at the economic conclusion of the first step. It has been found that the oil saturation in zone 8, that being the portion of the recovery zone between the infill well and injection well 2, occupying the lower thickness of the formation, is actually increased during the period of recovering oil from swept zone 4 in FIG. 1. This is caused by migration of oil mobilized by injected steam, into the portion of the formation through which steam does not travel during this first period. Thus, if the average oil saturation throughout viscous oil formation 1 is initially in the range of about 55 percent (based on the pore volume), injection of steam into the formation may reduce the average oil saturation throughout depleted zone 4 to 15 percent, but the oil saturation in zone 8 may actually increase to a value from 60 to 70 percent. The second step in the infill well process, in which fluids are recovered from infill well 6, accomplishes steam-stimulated recovery of petroleum from the zone designated as zone 8 in FIG. 2 which is not recoverable by processes taught in the prior art. Because fluid communication only exists between well 6 and the lower portion of the formation, no more than the lower 50 percent and preferably no more than the lower 25 percent or less of the formation, movement of oil into these perforations results in sweeping a portion of the formation not otherwise swept by steam. In FIG. 2, it can be seen that a portion 7 still remains unswept by the injected steam, but its volume is significantly less than the unswept volume prior to application of the second step of the process of our invention. Once the water cut of the fluid being produced from the formation by means of well 6 increases to a predetermined value, preferably at least 95 percent, production of fluids from the formation by means of well 6 is terminated and well 6 is converted to an injection well.

During the above described second step of the infill well process, steam injection into well 2 must be continued, and production of fluids from well 3 may be continued or may be decreased or discontinued depending on the water cut of fluid being produced at that time.

After conversion of infill well 6 from a producing well to an injection well, a fluid which may be steam, or hot water followed by steam, or cold water followed by hot water followed by steam, is injected into well 6 and fluid production is taken from well 3. In a preferred embodiment, the fluid first injected into well 6 is substantially all in the liquid phase during this step of this process, to encourage the injected fluid to travel in the lower portion of that zone of the recovery zone between infill well 6 and production well 3. During this step, production of fluids must be taken from well 3, and injection of fluid into well 2 is continued at a rate sufficient to ensure that a positive pressure gradient is maintained between well 2 and well 6. This is necessary to prevent reinvasion of the portion of the formation between well 2 and well 6 previously swept by steam and depleted of oil, with steam or oil, either one or both of which would reduce the oil recovery effectiveness of our process. If hot water is injected, it mobilizes viscous petroleum, although its effectiveness is less than steam. Hot water injection will, however, reduce the oil saturation in the lower portion of the zone between infill well 6 and producion well 3, and will therefore increase the permeability of that portion of the recovery zone. Hot water injection is continued until the water cut of the fluid being produced from well 3 rises to a value greater than about 80 percent and preferably greater than a value of about 95 percent. This ensures the optimum desaturation of the lower portion of the zone between infill well 6 and production well 3 which is necessary to increase the permeability of that section of the recovery zone sufficiently that the next phase of the process can be successful.

After the water cut of fluids being produced from well 3 during the hot water injection phase of this process (if hot water is employed) reaches the above-described levels, injection of liquid phase water into infill well 6 is terminated and steam injection into infill well 6 is thereafter initiated. Because of the previous step, during which hot water injection passed through the lower portion of the formation between infill well 6 and producing well 3, at least a portion of the steam being injected into infill well 6 passes through the lower portion of the formation. It must be appreciated that little steam would travel through the lower portion of the formation under these conditions if hot water had not first been injected for the purpose of desaturating the lower portion of the zone between wells 6 and 3, which established a zone of increased permeability, thereby ensuring that the flow channel permeability is sufficient that at least a portion of the steam will pass through the lower portions of the formation. This will result in some steam underriding the residual oil in the portion of the zone between wells 6 and 3, although a degree of steam override may be encountered in this portion of the process as communication is established between the point where steam is entering the formation through perforations in well 6 and previously depleted zone 4. Steam injection is continued, and the oil production rate is significantly better as a result of the previous creation of flow channels in the lower portion of the formation, since the stripping action is more efficient with respect to overlying oil saturated intervals than it is with respect to an underlying oil saturated interval. The reasons for this involve the fact that oil mobilized by thermal contact with the fluid passing under an oil saturated interval migrates downward by gravitational forces into the flow channel, and also because steam movement occurs in an upward direction into the oil-saturated interval more readily than downward, due to gravitational forces.

The above described last step is continued with steam being injected into infill well 6 with steam or hot water being injected into well 2 and fluid production being taken from well 3, until steam or steam condensate production at well 3 occurs to a predetermined extent. This step is preferably continued until the water cut of fluids being taken from the formation by well 3 reaches a value greater than 80 percent and preferably at least 95 percent.

FIG. 3 shows the swept zone 4 and unswept zones 7 and 7A at the conclusion of the above-described process employing use of an infill well first as a producer and then as an injector.

Another variation of the above described process is especially suitable for formations having very high viscosity oil, i.e. those formations which contain petroleum whose API gravity is less than 15° and preferably less than 10° API. This preferred embodiment involves one additional step, which occurs prior to the injection of hot water into infill well 6. In this embodiment, after fluid production from infill well 6 has terminated and infill well 6 has been converted to an injection well, cold water is injected into infill well 6. For the purpose of this process, by "cold water", it is meant water whose temperature is less than 160° and preferably less than 80° F. Ordinarily, it is sufficient to inject water at surface ambient conditions. The passage of cold water into portions of the formation immediately adjacent to the perforations in infill well 6 causes the condensation and collapse of the steam vapor occupying the formation, increasing the liquid water saturation of that portion of the formation, and therefore decreases the permeability of the portion of the formation in which steam condensation has occurred. This further encourages the passage of the subsequently injected hot water into the lower flow channels in the portion of the recovery zone between well 6 and well 3.

The present invention comprises an improvement in the above described process employing the infill well with multi-step injection production sequences. Although the amount of the formation swept by steam be use of the above described process is significantly better than in a state-of-the-art, two well steam drive process, it is still possible to improve the above described process as will be described more fully hereinafter below. The improvement resides in (1) further increasing the amount of the recovery zone swept by steam and which will be depleted by application of the process, and/or (2) improving the thermal efficiency of the steam drive oil recovery process. It can be appreciated that two processes may sweep substantially the same amount of the formation and recover the same amount of oil, but if one requires significantly less fuel for production of steam to perform the process, it will be much more attractive from an economical point of view than the other process.

The improvement which constitutes the present invention involves providing two separate flow paths, one between the surface of the earth and the bottom half or less of the formation, and a separate flow path, preferably in the same well, which establishes fluid communication between the surface of the earth and the top half or less of the oil formation. This arrangement may be provided at the production well, or at the injection well, or at the infill well, or a combination of any two of these wells, or all three wells may be completed for maximum improvement in sweep efficiency. One effective means for accomplishing the desired dual completion of wells involves using a tubing to establish communication with the bottom preforations, the tubing being packed off from the casing at a point intermediate between the two sets of perforations, and employing the annular space between the tubing and casing as the second flow path which establishes communication between the surface and the upper half or less of the formation. This is the method depicted in the attached figures, although of course, other completion techniques are possible. For example, each flow path may be accomplished by use of separate tubing, and this is a preferred embodiment if pumping of the wells is necessary during any phase in which both communication zones are utilized for oil production. When the production well is dually completed, it is preferable that it be completed so the flow path between the upper portion of the formation and the surface of the earth can be used for fluid injection or fluid production.

FIG. 3 illustrates one preferred embodiment of the process of our invention, in which the production well is dually completed to permit simultaneous production of fluids from the bottom half or less of the formation with injection of fluids into the upper half or less of the formation, utilizing the two separate flow paths provided in the well. This embodiment is in many instances the most cost-effective embodiment of our process. In this instance, perforations 9 establish fluid communication between the upper half or less of the oil formation adjacent the production well 3 and the surface of the earth by means of the annular space between the well casing of well 3 and the tubing contained in well 3. A packer isolates the annular space between the packer and casing at a point between perforations 9 and lower perforations 10. By this means, the tubing of well 3 is in fluid communication with the bottom half or less of the formation via perforations 10. The embodiment depicted in FIG. 3 is a particularly preferred embodiment from a standpoint of cost effectiveness, since the effectiveness of introducing a mobility decreasing fluid into the upper portion of the formation to restrict flow of steam through a previously steam-swept interval is most efficient when applied to that portion of the steam-swept zone adjacent to the production well, from a cost effectiveness point of view especially. In the embodiment depicted in FIG. 3 injection well 2 and infill well 6 are singly completed wells similar to that shown in FIG. 2, with injection well 2 being in fluid communication with substantially all of the formation and with infill well 6 being in fluid communication with no more than the bottom half and preferably no more than the bottom 25 percent of the formation.

FIG. 4 illustrates another embodiment of the process of our invention, in which injection well 2 and production well 3 are singly completed in a conventional manner such as that shown in FIG. 2, but infill well 6 is dually completed. Infill well 6 is completed similar to the manner in which well 3 was completed in the embodiment of FIG. 3; that is, the tubing communicates with the bottom half or less of the formation through lower perforations 11, while the annular space establishes the fluid flow communication path between the surface of the earth and the upper half or less of the formation by means of perforations 12.

Figure 5:
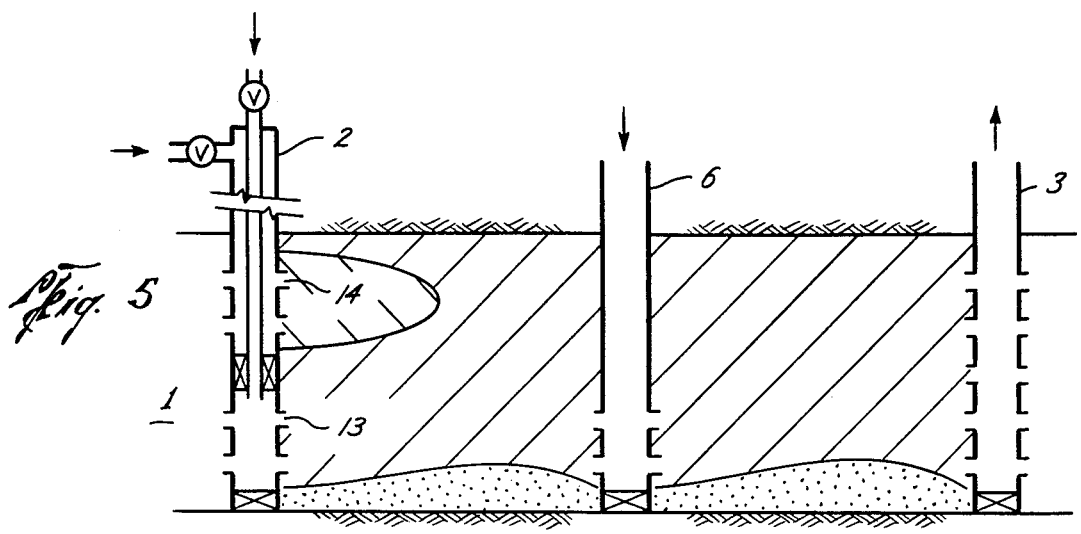
FIG. 5 illustrates another embodiment of the process of our invention in which the injection well is provided with two separate fluid injection means, one of which is in fluid communication with the upper portions of the formation to permit introduction of low mobility fluid into the upper portion of the formation adjacent to the injection well.

FIG. 5 illustrates yet another embodiment of our process, in which injection well 2 is dually completed, while infill well 6 and production well 3 are singly completed in a conventional manner. In this embodiment, one fluid communication flow path is established between the surface of the earth and about half or less of the formation adjacent to the injection well by the tubing in well 2 through perforation 13, while the second flow path establishes communication between the surface of the earth and the upper half or less of the oil formation adjacent injection well 2 by means of perforations 14.

Figure 6:
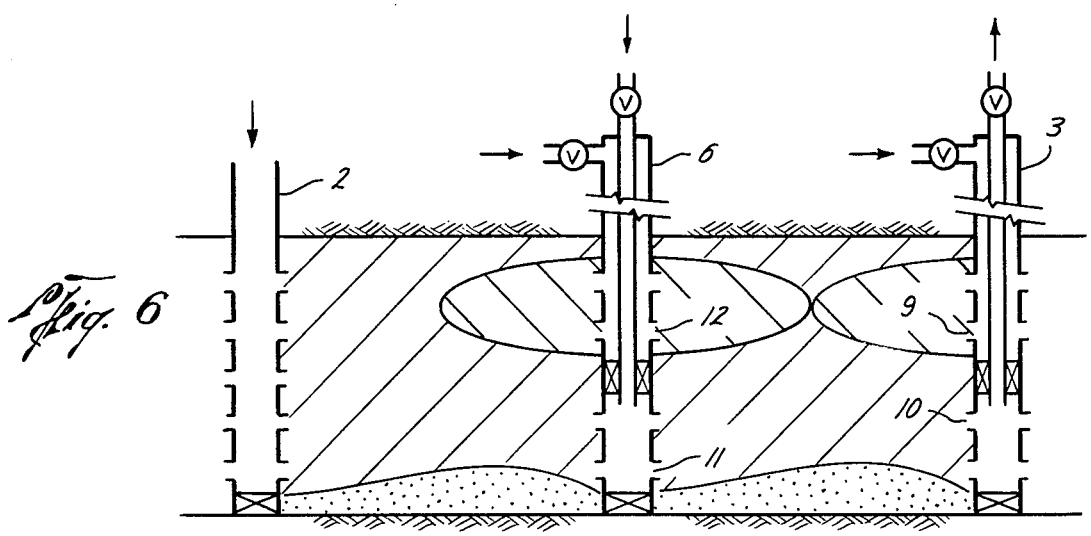
FIG. 6 illustrates a preferred embodiment of the process of our invention in which both the production well and the infill well are provided with two separate flow paths, each including one flow path establishing communication between the surface of the earth and the upper half or less of the formation, and employment of these flow paths for the purpose of introducing a low mobility fluid into the upper portion of the formation adjacent the infill well and the production well.

FIG. 6 illustrates another particularly preferred embodiment of the process of our invention, in which injection well 2 is singly completed in a conventional manner, while infill well 6 and production well 3 are each dually completed. In this embodiment, it is possible to accomplish very significant improvements in sweep efficiency and thermal efficiency by recovering oil from the bottom of the formation adjacent the production well while injecting into the formation via the injection well, while simultaneously injecting steam and/or hot water into the lower portion of the formation adjacent infill well 6 and simultaneoulsy or sequentially as desired introducing a low mobility fluid into the upper portion of the formation adjacent infill well 6 and production well 3. By this means, the propensity for steam to migrate through the steam-swept zone in the upper portion of the formation is decreased as a result of introducing the lower mobility fluid into the steam swept channels by the upper perforations of wells 3 and 6. This will further confine the steam injected into the formation via the injection well to the bottom portion of the formation, and thus improve the vertical conformance and the thermal efficiency of the steam drive oil recovery process.

FIG. 7 illustrates another embodiment of the process of our invention, in which infill well 6 is singly completed while injection well 2 and production well 3 are each dually completed as described above.

FIG. 8 illustrates still another embodiment in the process of our invention in which production well 3 is singly completed while injection well 2 and infill well 6 are each dually completed as described above.

FIG. 9 illustrates the embodiment which ordinarily accomplishes the maximum improvement in sweep efficiency and thermal efficiency, although not necessarily the most cost effective embodiment. Nevertheless, in certain formations it is the preferred method of applying the improved process of our invention. In this embodiment, all three wells are dually completed which permits simultaneous or sequential injection of fluid into the upper portion and lower portion of the formation, with respect to the injection in infill wells, and simultaneous injection of fluid into the upper portion of the formation adjacent the production well while recovering petroleum and other fluids from the lower portion of the formation by means of the tubing of well 3.

In any of the foregoing embodiments, the fluid to be introduced into the steam swept, upper portion of the formation adjacent the particular well being treated, is a fluid whose mobility is less than the mobility of steam. In its simplest embodiment, the fluid employed is liquid phase water. This accomplishes a significant reduction in the permeability of the steam-swept channels in the upper portion of the formation, since saturation of the pore spaces with substantially all liquid phase water greatly reduces the permeability thereof to steam, and thus encourages steam to move to other portions of the formation, contacting oil in the lower portions of the formation which would not ordinarily be contacted. If the temperature of the water injected into the upper portions of the formation in this embodiment is significantly less than the temperature of steam at the pressure existing in the formation, it will cause collapse of the steam vapor occupying portions of the pore spaces in the upper steam swept channels, thus further decreasing the permeability of those channels to steam. The optimum temperature of the water injected into any of the portions of the formation in this embodiment is from 40° to 200° and preferably from 60° to 150° F.

In another embodiment, the permeability reduction is further enhanced by injecting into the upper, steam swept portions of the formation by means of any of the foregoing separate communication paths therewith, a fluid whose viscosity is greater than water (the mobility is less than liquid phase water at formation conditions). For example, a temperature stable polymer may be incorporated into the upper, steam swept portions of the formation. By incorporating from 100 to 10,000 parts per million hydrophilic polymer such as polyacrylamide in field water, for example, the permeability reduction achieved is significantly better than that achieved by injection of water containing no hydrophilic polymer into these portions of the formation. Hydrophilic polysaccharide polymers polyethylene oxide and polyvinyl alcohol are also effective for this purpose, and in a range from about 100 to 10,000 and preferably from about 1,000 to 2,000 parts per million.

Another preferred fluid for introduction into the upper, steam swept channel of the formation is an aqueous fluid containing colloidal silica in the concentration range of from 100 to 5000 and preferably from 250 to 3000 parts per million. This material has the advantage of being more stable at elevated temperatures than the above described organic polymers. Reference is made to the following U.S. patents for additional disclosures relating to the composition of fluids containing colloidal silica to be employed and methods of formulating and introducing the solutions into the formation: U.S. Pat. Nos. 3,965,986; 3,876,007; 3,818,989; 3,868,999; 3,956,145; 3,780,808; 3,817,330; 3,759,326; and 3,862,044.

Another especially preferred fluid for use in application of the process of our invention is an aqueous fluid containing an emulsifying, surface active agent such as petroleum sulfonate whose equivalent weight is from 325 to 475. The aqueous fluid forms a viscous, oil in water emulsion with residual oil contained in the steam swept portions of the formation, and as a consequence of the emulsification reaction, the viscosity of the fluid is increased significantly over the viscosity of water. The fluid introduced into the formation may itself be an emulsion, so long as the oil content is sufficiently low that the viscosity of the emulsion is consistent with the injection conditions, i.e., its viscosity must be sufficiently low so it will flow through the steam-swept channel in order to accomplish treatment of effective distance into the formation away from the perforations in the wells. We have found that by incorporating a small amount of oil in the fluid injected into the formation, the viscosity of the fluid will remain relatively low, but the viscosity is developed rapidly as residual oil present in the flow channels of the formation are incorporated into the emulsion as the fluid passes away from the point of injection into the formation.

The timing of injecting the low mobility fluid into the upper, steam swept channels of the formation is quite critical. It is imperative that the low mobility fluid be introduced after development of the steam swept channels, or it will block flow of steam through portions of the formation from which oil has not yet been recovered, and so will reduce the effective oil recovery. Accordingly, in the above described sequence, relating to the basic process employing the use of infill wells for a steam drive oil recovery process described hereinabove, introduction of the low mobility fluid into the upper portions of the formation adjacent any of the wells should not be undertaken until steam injection into the injection well and recovery of petroleum from the formation has proceeded sufficiently that the zone to be treated has been swept by steam and desaturated of oil. For example, in the embodiment illustrated in FIGS. 6, 7 and 9, in which fluid flow communication is established between the surface of the earth and the upper portion of the formation adjacent production well 3, the preferred method of operating involves injecting steam into well 2 and producing fluids from well 3 by means of the flow path in communication with the other portion of the formation, until steam breakthrough has occurred, after which the low mobility fluid may be introduced into the upper portion of the formation adjacent to well 3 to reduce the tendency for steam to flow exclusively through those steam swept channels. Whether this is done as a separate step during which time further fluid injection into any of the wells is terminated, or simultaneously with step 2 of the infill well process in which fluid production is taken from the bottom perforations of the infill well, and/or with the next step in which fluids are injected into the bottom of the formation adjacent the infill well and fluids are produced from, in this instance, the bottom of production well 3, is optional depending on the particular problems existing in the formation to which our process is being applied.

For the purpose of fully illustrating the preferred methods of operating according to the process of our invention, the following is a brief summary of the sequence for each of the embodiments illustrated in the figures and discussed above.

In the first method, illustrated in FIG. 3, in which treatment is applied only in the upper portion of the formation adjacent to production well 3, the following is the preferred sequence of steps.

(1) Inject a thermal oil recovery fluid comprising steam into injection well 2 and recover fluids from production well 3 by means of the upper, lower, or both perforations in well 3 until the water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 until the water cut reaches a predetermined level, preferably at least 95 percent.

(3) Convert infill well 6 from a producer to an injector and inject steam, or hot water followed by steam, or cold water followed by hot water followed by steam, into infill well 6 and recover fluid from the upper, lower, or both perforations of well 3 until the water cut reaches a predetermined level.

(4) Inject the low mobility fluid into the upper portion of the formation adjacent to production well 3. This may be done simultaneously with production of fluids from the bottom portion of the formation by means of perforations 10 in well 3, although of course production of fluids from the upper portions of the formation must be terminated during any time in which fluid injection into the upper portion of the formation through perforations 9 is undertaken.

In the second method, illustrated in FIG. 4, in which treatment is applied only in the upper portion of the formation adjacent to infill well 6, the following sequence of steps is applied.

(1) Inject a thermal oil recovery fluid comprising steam into injection well 2 and recover fluids from production well 3 by means of the perforations in well 3 until the water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 until the water cut reaches a predetermined level, preferably at least 95 percent.

(3) Convert the flow path of infill well 6 communicating with the bottom of the formation from a producer to an injector and inject steam, or hot water followed by steam, or cold water followed by hot water followed by steam into infill well 6 and recover fluid from well 3 until the water cut reaches a predetermined level.

(4) Inject the low mobility fluid into the upper portion of the formation adjacent to infill well 6. This may be done simultaneously with production of fluids from the bottom portion of the formation by means of perforations 11 in well 6, and/or during the period of fluid injection into the bottom perforations 11 of infill well 6 and fluid production from well 3.

In the third embodiment, illustrated in FIG. 5, in which treatment is applied only in the upper portion of the formation adjacent to injection well 2, the following sequence of steps is applied. p (1) Inject a thermal oil recovery fluid comprising steam into the formation by means of the upper, lower or both perforations in injection well 2 and recover fluids from production well 3 until the produced fluid water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 until the water cut reaches a predetermined level, preferably at least 95 percent.

(3) Convert infill well 6 from a producer to an injector and inject steam, or hot water followed by steam, or cold water followed by hot water followed by steam into infill well 6 and recover fluid from well 3 until the water cut reaches a predetermined level.

(4) Inject the low mobility fluid into the upper portion of the formation adjacent to injection well 2. This may be done simultaneously with production of fluids from well 3 or well 6, although of course injection of steam into the bottom portions of the formation must be terminated during any time in which treating fluid injection into the upper portion of the formation through perforations 14 is undertaken.

In the fourth embodiment of our method, illustrated in FIG. 6, in which treatment is applied in the upper portion of the formation adjacent to production well 3 and infill well 6, the steps are applied in the following sequence.

(1) Inject a thermal oil recovery fluid comprising steam into injection well 2 and recover fluids from production well 3 by means of the upper, lower, or both perforations in well 3 until the water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 by means of the bottom perforations 11 until the water cut reaches a predetermined level, preferably at least 95 percent.

(3) Convert the flow path of infill well 6 which communicates with the bottom of the formation from a producer to an injector and inject steam, or hot water followed by steam, or cold water followed by hot water followed by steam into that flow path of infill well 6 via perforations 11 and recover fluid from the upper, lower, or both perforations of well 3 until the water cut reaches a predetermined level.

(4) Inject the low mobility fluid into the upper portion of the formation adjacent to infill well 6 and production well 3. This may be done simultaneously with production of fluids from the bottom portion of the formation by means of perforations 10 in well 3, although of course production of fluids from the upper portions of the formation must be terminated during any time in which fluid injection into the upper portion of the formation through perforations 9 is undertaken. Injection of low mobility treating fluid into the upper part of the formation adjacent to well 6 by perforations 12 may be conducted simultaneously or sequentially with respect to injection of cold water, hot water or steam into the bottom portion of the formation adjacent well 6 by perforations 11.

In the fifth embodiment of our invention, illustrated in FIG. 7, in which treatment is applied in the upper portion of the formation adjacent to injection well 2 and production well 3, the following is the sequence in which the essential steps are applied.

(1) Inject a thermal oil recovery fluid comprising steam into injection well 2 by means of the upper, lower or both sets of perforations and recover fluids from production well 3 by means of the upper, lower, or both perforations in well 3 until the water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 until the water cut reaches a predetermined level, preferably at least 95 percent.

(3) Convert infill well 6 from a producer to an injector and inject steam, or hot water followed by steam, or cold water followed by hot water followed by steam into infill well 6 and recover fluid from the upper, lower, or both perforations of well 3 until the water cut reaches a predetermined level.

(4) Inject the low mobility fluid into the upper portion of the formation adjacent to injection well 2 and production well 3. This may be done simultaneously with injection of steam into the bottom portion of the formation adjacent well 2 by perforations 13 and production of fluids from the bottom portion of the formation by means of perforations 10 in well 3, although of course injection of steam via perforations 14 and production of fluids from the upper portions of the formation via perforations 9 must be terminated during any time in which fluid injection into the upper portion of the formation through perforations 9 of well 3 and perforations 14 of well 2 are undertaken.

In the sixth embodiment of the method of our invention, illustrated in FIG. 8, in which treatment is applied in the upper portion of the formation adjacent to injection well 2 and infill well 6, the following sequence is followed.

(1) Inject a thermal oil recovery fluid comprising steam into the formation via the upper, lower or both sets of perforations in injection well 2 and recover fluids from production well 3 until the water cut reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 by perforations 11 until the water cut of fluids being produced from well 6 reaches a predetermined level, preferably at least 95 percent.

(3) Convert the communication path in communication with perforations 11 of infill well 6 from a producer to an injector and inject steam, or hot water followed by steam, or cold water followed by hot water followed by steam into the bottom of the formation adjacent infill well 6 and recover fluid from well 3 until the water cut reaches a predetermined level.

(4) Inject the low mobility fluid into the upper portion of the formation adjacent to injection well 2 and infill well 6. This is done simultaneously with production of fluids from well 3, and from the bottom perforations 11 of well 6, as well as simultaneously with injection of steam into the bottom of the formation adjacent wells 2 and 6 by perforations 13 and 11.

In the seventh embodiment of the process of our invention, illustrated in FIG. 9, in which treatment is applied in the upper portion of the formation adjacent to injection well 2, infill well 6 and production well 3, the following sequence is followed.

(1) Inject a thermal oil recovery fluid comprising steam into the upper, lower or both sets of perforations of injection well 2 and recover fluids from production well 3 by means of the upper, lower, or both sets of perforations in well 3 until the water cut of fluids being produced from well 3 reaches a predetermined level, preferably at least 95 percent, and the especially preferred embodiment comprises operating until production of live steam is observed at well 3.

(2) Continue injecting the thermal oil recovery fluid into well 2 and recover fluids from the bottom of the formation adjacent to infill well 6 via perforations 11 until the water cut reaches a predetermined level, preferably at least 95 percent.

(3) Convert the communication path of infill well 6 which is in communication with the bottom of the formation via perforations 11 from a producer to an injector and inject steam, or hot water followed by steam, or cold water followed by hot water followed by steam into the bottom of the formation adjacent to infill well 6 and recover fluid from the upper, lower, or both perforations of well 3 until the water cut reaches a predetermined level.

(4) Inject the low mobility fluid into the upper portion of the formation adjacent to injection well 2, infill well 6 and production well 3. This may be done simultaneously with production of fluids from the bottom portion of the formation by means of perforations 10 in well 3 or perforations 11 in well 6, although of course production of fluids from the upper portions of the formation by well 3 must be terminated during any time in which fluid injection into the upper portion of the formation through perforations 9 is undertaken. Injection of the low mobility fluid into the upper portion of the formation adjacent to wells 2 and 6 by perforations 14 and 12 may also be applied simultaneously with injection of steam or hot water into the bottom of the formation adjacent to wells 2 or 6 by perforations 13 and 11.

EXPERIMENTAL EVALUATION

For the purpose of demonstrating the operability of the process employing infill wells as used in our invention and of showing the magnitude of results achieved from application thereof is compared to conventional steam drive processes following prior art teaching, the following laboratory experiments were performed.

A laboratory cell was constructed, the cell being 3 inches wide, 8½ inches high and 18½ inches long. The cell is equipped with three wells, an injection well and production well in fluid communication with the full height of the cell and a central infill well which is in fluid communication with lower 15 percent of the cell. A base steam drive flood was conducted in the cell to demonstrate the magnitude of the steam override condition. The cell was first packed with sand and saturated with 14 degree API gravity crude to initial oil saturation of 53.0 percent. The infill well was not used in the first run, this run being used to simulate a conventional throughput process according to the steam drive processes described in the prior art. After steam injection into the injection well and fluid production from the production well continued to a normal economic limit, the average residual oil saturation in the cell was 46.3 percent. In the second run, the infill well process was applied to the cell, with steam being injected into the injection well and oil production taken from the production well until live steam breakthrough was detected at the production well, followed by production from the infill well, followed by first injecting cold water, then hot water and then steam into the cell by means of the infill well and recovering fluid from the producing well to a water cut of 98 percent. The overall residual oil saturation at the conclusion of this run was 30.1 percent compared with the initial oil saturation of 53 percent in both cases. It can be seen that the base flood recovered only 12.6 percent of the oil present in the cell whereas application of the infill well process resulted in recovering 43 percent of the oil, or about 3.4 times as much oil as the base run.

Thus we have disclosed and demonstrated in laboratory experiments how significantly more viscous oil may be recovered from an oil formation by a throughput, steam drive process by employing the process of our invention with infill wells located between injection and production wells one or more of which are dually completed, and a multi-step process as described above. While our invention is described in terms of a number of illustrative embodiments, it is clearly not so limited since many variations of this process will be apparent to ersons skilled in the art of viscous oil recovery methods without departing from the true spirit and scope of our invention. Similarly, while mechanisms have been discussed in the foregoing description of the process of our invention, these are offered only for the purpose of complete disclosure and is not our desire to be bound or restricted to any particular theory of operation of the process of our invention. It is our desire and intention that our invention be limited and restricted only by the limitations and restrictions of the claims appended immediately hereinafter below.

We claim:

1. A method of recovering viscous petroleum from a subterranean, permeable, viscous petroleum-containing formation, comprising:
   (a) providing an injection well containing a flow path in fluid communication with at least a portion of the petroleum formation;
   (b) providing a production well containing at least two separate flow paths, the first path establishing communication between the surface of the earth and the upper half or less of the petroleum formation and the second establishing fluid communication between the surface of the earth and the lower half or less of the petroleum formation, said injection and production well defining a recovery zone within the formation;
   (c) providing an infill well in fluid communication with the bottom half or less of the formation, said infill well being within the recovery zone defined by the injection well and production well;
   (d) injecting a thermal oil recovery fluid comprising steam into the injection well and recovering a fluid comprising water and petroleum from the formation via the production well until the fluid being recovered from the production well comprises a predetermined amount of steam or water;
   (e) thereafter continuing injecting a fluid into the injection well and recovering fluids including petroleum from the formation by the infill well until the fluid being recovered comprises a predetermined fraction of steam and water;
   (f) injecting a fluid whose mobility is less than steam into the upper portion of the formation adjacent to the production well by means of the first flow path therein in an amount sufficient to reduce permeability of at least a portion of the treated zone;
   (g) injecting a thermal oil recovery fluid into the infill well and continuing injecting fluid into the injection well, and recovering fluids from the bottom of the formation adjacent the production well by means of the second flow path of the production well until a percentage of water in the fluid being recovered reaches a predetermined value.

2. A method as recited in claim 1 wherein the infill well contains at least two flow paths, a first flow path in fluid communication with the upper half or less of the formation adjacent to the infill well and a second flow path in fluid communication with the bottom half or less of the portion of the formation adjacent to the infill well said second flow path being used for fluid production in step (e) and fluid injection in step (g), and comprising the additional step of injecting a low mobility fluid into the upper portion of the formation adjacent to the infill well by use of the first flow path between steps (d) and (g).

3. A method as recited in claim 1 wherein the injection well contains at least two flow paths, a first flow path in fluid communication with the upper half or less of the formation adjacent to the injection well and a second flow path in fluid communication with the bottom half or less of the portion of the formation adjacent to the injection well, said second flow path being used for fluid injection in steps (d) and (e) and comprising the additional step of injecting a low mobility fluid into the upper portion of the formation adjacent to the injection well by means of the first flow path between steps (d) and (g).

4. A method as recited in claim 1 wherein the low mobility fluid injected into the upper portion of the formation adjacent to the production well in step (f) is substantially all liquid phase water whose temperature is from 40° to 200° F.

5. A method as recited in claim 1 wherein the low mobility fluid injected into the upper portion of the formation in step (f) comprises water containing from 100 to 10,000 parts per million of a hydrophilic polymeric viscosity increasing substance.

6. A method as recited in claim 5 wherein the hydrophilic polymer is polyacrylamide.

7. A method as recited in claim 5 wherein the hydrophilic polymer is polysaccharide.

8. A method as recited in claim 1 wherein the low mobility fluid injected into the formation in step (f) comprises an aqueous solution containing from 100 to 5,000 parts per million colloidal silica.

9. A method as recited in claim 1 wherein the low mobility fluid injected into the upper portion of the formation in step (f) comprises an aqueous fluid containing an emulsifying surfactant.

10. A method as recited in claim 9 wherein the surfactant is petroleum sulfonate whose equivalent weight is from 325 to 475.

11. A method as recited in claim 1 wherein the low mobility fluid injected into the upper part of the formation in step (f) is an emulsion whose oil content is from 1 to 40 percent.

12. A method as recited in claim 11 wherein the oil content of the emulsion is selected to maintain the viscosity at a value from 1 to 50 centipoise.

13. A method as recited in claim 1 wherein the low mobility fluid of step (f) is water containing an emulsifying surfactant which forms an emulsion in the zone of the formation into which it is injected with residual oil.

14. A method of recovering viscous petroleum from a subterranean, permeable, viscous petroleum-containing formation, comprising:
   (a) providing an injection well containing a flow path in fluid communication with at least a portion of the bottom of the petroleum formation;
   (b) providing a production well in fluid communication with at least a portion of the petroleum formation;
   (c) providing an infill well containing a first flow path in fluid communication with the top half or less of the formation, and a second flow path in fluid communication with the bottom half or less of the formation, said infill well being within the recovery zone defined by the injection well and production well;
   (d) injecting a thermal oil recovery fluid comprising steam into the injection well and recovering fluid including petroleum from the formation via the production well until the fluid being recovered from the production well comprises a predetermined amount of steam and water;
   (e) thereafter continuing injecting steam into the injection well and recovering fluids including petroleum from the bottom of the formation by the second flow path of the infill well until the fluid being recovered comprises a predetermined fraction of steam and water;
   (f) injecting a fluid having lower mobility than steam into the upper portion of the formation adjacent to the infill well by means of the first flow path therein in an amount sufficient to reduce the flow rate of steam through at least a portion of the treated zone, after completion of step (d);
   (g) injecting a thermal oil recovery fluid into the second flow path of the infill well while continuing injecting fluid into the injection well and recovering fluids from the bottom of the formation adjacent the production well by means of the production well until a percentage of water in the fluid being recovered reaches a predetermined value.

15. A method as recited in claim 14 wherein the injection well contains at least two flow paths, a first flow path in fluid communication with the upper half or less of the formation adjacent to the injection well and a second flow path in fluid communication with the bottom half or less of the portion of the formation adjacent to the injection well, said second flow path being used for fluid injection in steps (d), (e) and (g) and comprising the additional step of injecting a low permeability fluid into the upper portion of the formation adjacent to the infill well via the first flow path between steps (d) and (g).

16. A method as recited in claim 14 wherein the low mobility fluid injected into the upper portion of the formation adjacent to the production well in step (f) is substantially all liquid phase water whose temperature is from 40° to 200° F.

17. A method as recited in claim 14 wherein the low mobility fluid injected into the upper portion of the formation in step (f) comprises water containing from 100 to 10,000 parts per million of a hydrophilic polymeric viscosity increasing substance.

18. A method as recited in claim 17 wherein the hydrophilic polymer is polyacrylamide.

19. A method as recited in claim 17 wherein the hydrophilic polymer is polysaccharide.

20. A method as recited in claim 14 wherein the low mobility fluid injected into the formation in step (f) comprises an aqueous solution containing from 100 to 5,000 parts per million colloidal silica.

21. A method as recited in claim 14 wherein the low mobility fluid injected into the upper portion of the formation in step (f) comprises an aqueous fluid containing an emulsifying surfactant.

22. A method as recited in claim 21 wherein the surfactant is petroleum sulfonate whose equivalent weight is from 325 to 475.

23. A method as recited in claim 21 wherein the fluid is an emulsion whose oil content is from 1 to 40 percent.

24. A method as recited in claim 23 wherein the oil content of the emulsion is selected to maintain the viscosity at a value from 1 to 50 centipoise.

25. A method as recited in claim 21 wherein the fluid is an oil-free aqueous solution which forms an emulsion in the treated zone with residual oil contained therein.

26. A method of recovering viscous petroleum from a subterranean, permeable, viscous petroleum-containing formation, comprising:
   (a) providing a production well in fluid communication with a substantial amount of vertical thickness of the petroleum formation;
   (b) providing an injection well containing at least two separate flow paths, one between the surface of the earth and the upper half or less of the petroleum formation and the second being in fluid communication between the surface of the earth and the lower half or less of the petroleum formation, said injection and production well defining a recovery zone within the formation;
   (c) providing an infill well in fluid communication with the bottom half or less of the formation, said infill well being within the recovery zone defined by the injection well and production well;
   (d) injecting a thermal oil recovery fluid comprising steam into the injection well via the second flow path and recovering fluid including petroleum from the formation via the production well until the fluid being recovered from the production well comprises a predetermined amount of steam and water;
   (e) thereafter continuing injecting fluid into the injection well and recovering fluids including petroleum from the formation by the infill well until the fluid being recovered comprises a predetermined fraction of steam and water;
   (f) injecting a fluid whose mobility is less than steam into the upper portion of the formation adjacent to the injection well by means of the first flow path therein in an amount sufficient to reduce the flow rate of steam through at least a portion of the treated zone;
   (g) injecting a thermal oil recovery fluid into the infill well and recovering fluids from the bottom of the formation adjacent the production well while continuing injecting fluid into the injection well until a percentage of water in the fluid being recovered reaches a predetermined value.

27. A method as recited in claim 26 wherein the low mobility fluid injected into the upper portion of the formation adjacent to the injection well in step (f) is substantially all liquid phase water whose temperature is from 40° to 200° F.

28. A method as recited in claim 26 wherein the low mobility fluid injected into the upper portion of the formation in step (f) comprises water containing from 100 to 10,000 parts per million of a hydrophilic polymeric viscosity increasing substance.

29. A method as recited in claim 28 wherein the hydrophilic polymer is polyacrylamide.

30. A method as recited in claim 28 wherein the hydrophilic polymer is polysaccharide.

31. A method as recited in claim 26 wherein the low mobility fluid injected into the formation in step (f) comprises an aqueous solution containing from 100 to 5,000 parts per million colloidal silica.

32. A method as recited in claim 26 wherein the low mobility fluid injected into the upper portion of the formation in step (f) comprises an aqueous fluid containing an emulsifying surfactant.

33. A method as recited in claim 32 wherein the surfactant is petroleum sulfonate whose equivalent weight is from 325 to 475.

34. A method as recited in claim 32 wherein the fluid is an emulsion whose oil content is from 1 to 40 percent.

35. A method as recited in claim 34 wherein the oil content of the emulsion is selected to maintain the viscosity at a value from 1 to 50 centipoise.

36. A method as recited in claim 32 wherein the fluid is a substantially oil-free solution of surfactant which forms an emulsion in the treated zone with residual oil.

* * * * *